Aug. 13, 1946.   W. P. MASON   2,405,591
TRAINING DEVICE
Filed Dec. 27, 1943   5 Sheets-Sheet 1

INVENTOR
W. P. MASON
BY
ATTORNEY

Aug. 13, 1946.  W. P. MASON  2,405,591
TRAINING DEVICE
Filed Dec. 27, 1943   5 Sheets-Sheet 2

INVENTOR
W. P. MASON
BY
ATTORNEY

Aug. 13, 1946.  W. P. MASON  2,405,591
TRAINING DEVICE
Filed Dec. 27, 1943  5 Sheets-Sheet 3

INVENTOR
W. P. MASON
BY John Attall
ATTORNEY

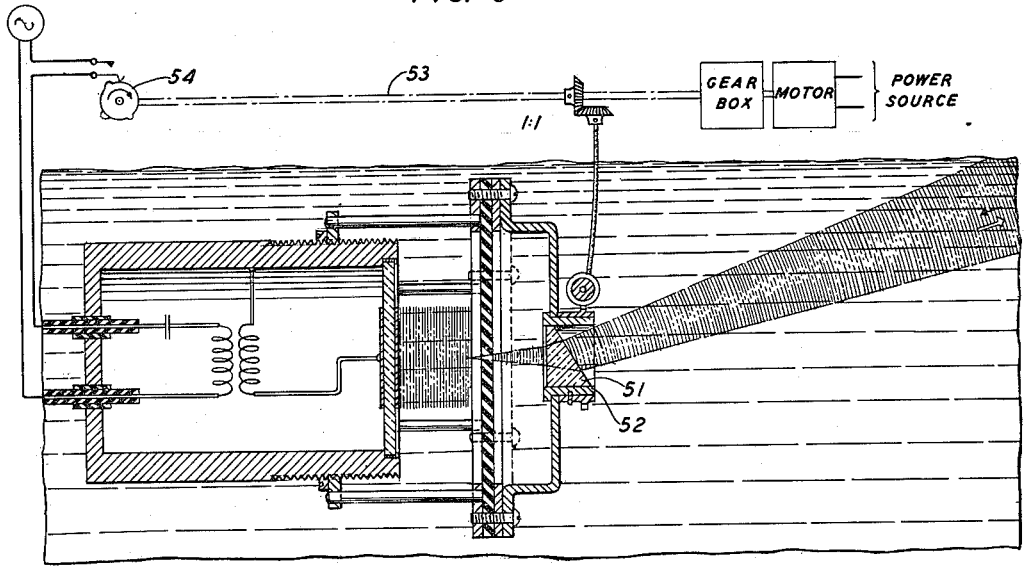
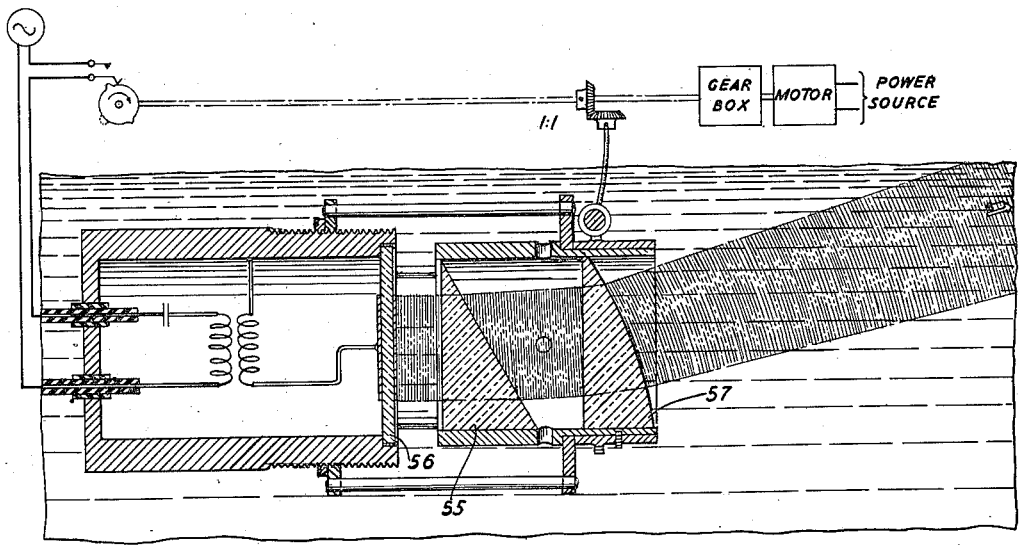

Aug. 13, 1946.　　　W. P. MASON　　　2,405,591
TRAINING DEVICE
Filed Dec. 27, 1943　　　5 Sheets-Sheet 5

INVENTOR
W. P. MASON
BY
ATTORNEY

Patented Aug. 13, 1946

2,405,591

UNITED STATES PATENT OFFICE 2,405,591

TRAINING DEVICE

Warren P. Mason, West Orange, N. J., assignor to Bell Telephone Laboratories, Incorporated, New York, N. Y., a corporation of New York Application December 27, 1943, Serial No. 515,731

8 Claims. (Cl. 35—25)

This invention relates to training apparatus and particularly to means for simulating conditions obtaining in one medium in another medium whereby operations may be carried out within small and practical confines representing operations ordinarily involving great distances and reproducible only at great expense and with great difficulty. More specifically the invention relates to means for energizing a radio detection and ranging device from an apparatus housed within reasonable compass wherein conditions which such a device is intended to detect may be closely simulated.

The object of the invention is to provide a medium whereby small scale objects within a limited compass may be exposed to radio detection and ranging apparatus and cause a response therein fully equivalent to the response expected in regular service for the purpose of training operators of such devices.

In accordance with the present invention the usual antenna of a radio detection and ranging system is replaced by an electromechanical transducer for transmitting and receiving compressional waves in a liquid medium such as water or water mixed with some other liquid whereby the scale is shrunk by a factor of two hundred thousand, thus making it possible to simulate the distance of 50 miles in 15 inches. Sound in water is substituted for radio waves.

Further, in accordance with this invention and in order to get a directional pattern with a reasonable size crystal, a transducer provided with an acoustic lens is employed. Whereas it is desirable in these radio detection and ranging systems to project as narrow a beam as possible for some uses, yet a reasonably broad beam extending to ten degrees each side of the center line is used for searching and since the trainee will first be assigned to operate this type of device the transducer used herein must simulate as nearly as possible that type of device. Hence, since the piezoelectric crystal used in the transducer is very highly directional at the high frequencies employed the beam must be spread by an acoustic lens.

Other characteristics of the radio direction and ranging devices may be simulated. A rotating beam device may be provided by placing an acoustic prism in the path of the beam and providing means for rotating such prism about the center line of the beam from the transducer so that in a complete rotation the refracted center line will move about the surface of a cone. Then by arranging to send out two pulses, one a half revolution behind the other when such beam passes through a horizontal plane and adjusting the angular pointing of the transducer until the size of the two reflections are equal, the azimuth angle can be accurately measured. In a similar manner the colatitude angle may be determined.

Where an acoustic lens is used the prism may be built into the lens by putting the center of curvature off the center line.

A split lobe modification of the radio location and ranging device can be simulated by using a crystal with two sets of platings in the form of semicircular areas. By thus dividing the plating in half and sending the wave through the lens, each half will have a slightly different directional pattern. By comparing the output received from the two different halves of the crystal and turning the unit until the received response is the same on each half, the direction of the reflection can be accurately located.

A feature of the invention is a means for operating a radio direction and ranging device by transmitting into and receiving from a medium in which the linear factors are greatly reduced.

Another feature is an electromechanical transducer for transmitting and receiving compressional waves in a dense medium substituted for the usual radio antenna in a radio direction and ranging device.

Another feature is a means for producing a rotating beam comprising a rotating acoustic prism placed in the beam of an electromechanical transducer.

Still another feature is a means for producing a beam pattern comparable to that of a radio antenna comprising a highly directional electromechanical transducer and an acoustic lens in the path of the beam.

Another feature is an electromechanical transducer and in the beam path therefrom an acoustic lens having its center of curvature off-center whereby rotation of said lens will produce a rotating beam.

Another feature is an electromechanical transducer comprising a crystal having split electrodes and an acoustic lens in the beam path therefrom whereby a split lobe beam pattern is found.

Other features will appear hereinafter.

The drawings consist of five sheets having nine figures, as follows:

Fig. 6 is a similar view showing the use of an acoustic prism arranged to rotate on an axis which coincides with the axis of the beam transmitted by the transducer whereby a comparison method may be used to promote accuracy;

Fig. 7 is a similar view in which the lens and the prism shown in Fig. 6 are in different form and are differently placed with respect to each other;

Figure 1:
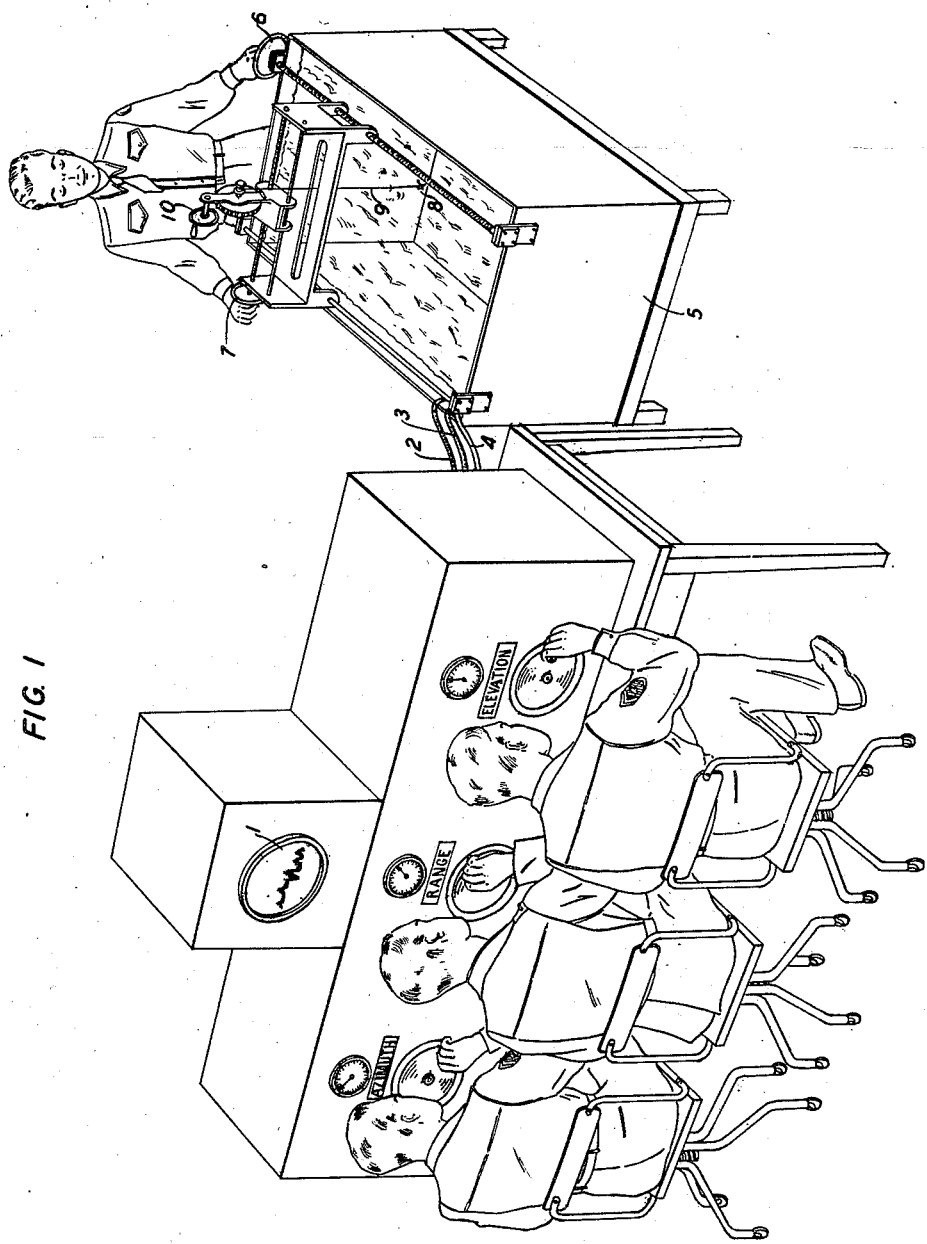
Fig. 1 is a perspective view showing an operator manipulating a miniature object in a tank to simulate the movement of an aircraft and three trainees engaged in making adjustments for azimuth range and elevation on a device equipped with standard radar circuits.

Fig. 1 shows the general arrangement of a training device by which technical operators may be trained to quickly and accurately operate the controls of a radio detection and ranging device by which an aircraft may be accurately located in space. In accordance with the present invention, an ultrasonic electro-mechanical transducer is substituted for the usual antenna of such a device and this transmits and receives under the surface of any appropriate liquid such as water so that a distance of approximately fifty miles may be measured in fifteen inches of the liquid. The remainder of the circuit is standard though it may be housed in more convenient form for training purposes.

Three trainees are seated before a panel and each has a hand-wheel to rotate to make adjustments for azimuth range and elevation as indicated by the designation above the hand-wheel. Each is also provided with a dial to indicate the value to which he has adjusted his part of the apparatus. Mounted above and in view of each of the trainees is an oscilloscope 1 by which each may judge the result of his effort. In general, the oscilloscope is arranged to show a horizontal trace showing on two levels. The effort of the two end trainees is to make an adjustment which will produce the greatest amplitude in the target echo while the effort of the center trainee is to make an adjustment which will hold the target echo as nearly as possible at the point where the horizontal trace changes its level.

The hand-wheels operated by the trainees making adjustments for azimuth and elevation will operate through flexible shafts 2 and 3 to move the electromechanical transducer which is immersed in the tank 5. The electrical connections to the transducers are made over conductors 4. An instructor is shown behind the tank 5 operating hand-wheels 6 and 7 by means of which he may move an object 8 suspended on a filament 9. By the use of these hand-wheels as well as a third here numbered 10, the object may be moved to any point within the confines of the tank. The hand-wheels may be geared so that the movement of the object 8 will simulate in time and space relations the movement of an aircraft.

Figure 2:
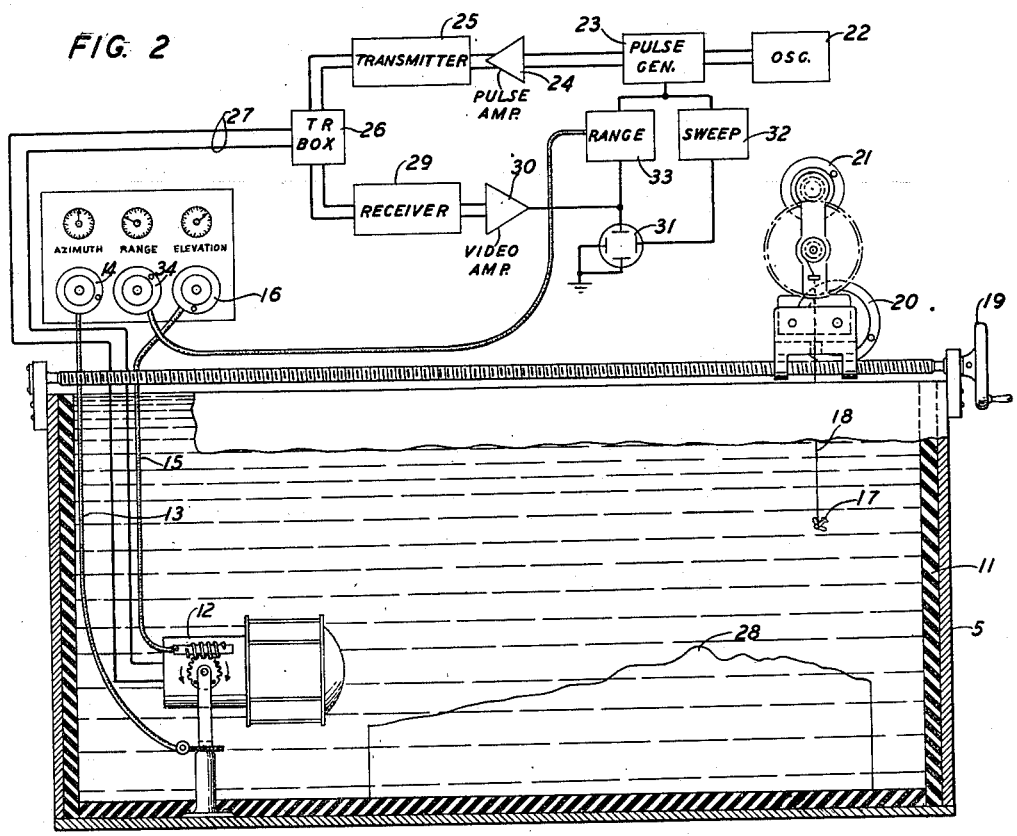
Fig. 2 is a schematic diagram coupled with a cross-sectional view of a tank in which an ultrasonic transducer and an object to be measured may be immersed to simulate the operation of a standard radar device.

In Fig. 2 the arrangement of the training device is shown schematically. The tank 5, shown in cross-section, consists of a steel tank lined with some sound absorbing material and filled with water or a mixture of water and some other liquid. Immersed in the liquid is an electromechanical transducer 12 which may be mechanically rotated about a vertical axis through the flexible shaft 13 by the hand-wheel 14. In a similar manner an adjustment about a horizontal axis may be made through the flexible shaft 15 by the hand-wheel 16.

An object, here shown as a miniature plane 17, is suspended on a filament 18 and given three-dimensional movement through the use of hand-wheels 19, 20 and 21, this showing being by way of example to indicate one simple way in which it can be done.

The essential elements of the radar system are shown in the circuit diagram above. An oscillator 22 provides power to operate a pulse generator 23 which supplies pulses through an amplifier 24 to a transmitter 25. Through the transmitting-receiving circuit 26 the pulses of proper frequency current are connected to the channel 27 which ordinarily leads to an antenna but in the present case leads instead to the transducer 12. The transducer 12 transmits ultrasonic compressional waves which travel toward the object 17, or the irregular reflecting surface 28 representing the terrain, and receives the echoes therefrom, which are then passed through the receiver 29 and amplifier 30 to operate the oscilloscope 31. By the sweep circuit 32 and the adjustable range circuit 33 interposed between the pulse generator 23 and the oscilloscope 31, the indication thereon may be made to assume the form indicated in Fig. 4. Through adjustment of the range circuit 33 by the hand-wheel 34, the target echo may be made to occur at the step in the general level of the oscilloscope trace and through continuous adjustment this echo may be kept at this point as the object 17 is moved.

Figure 3:
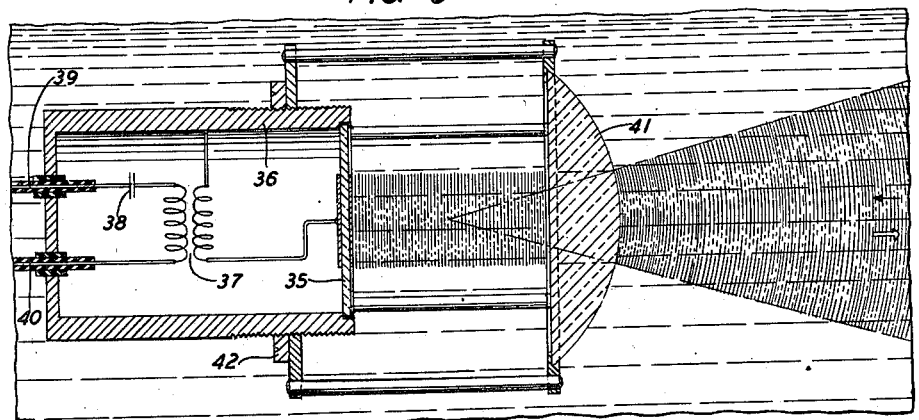
Fig. 3 is an enlarged cross-sectional and diagrammatic view showing the construction of a suitable ultrasonic transducer and an acoustic lens for spreading the beam transmitted therefrom.
Figure 4:
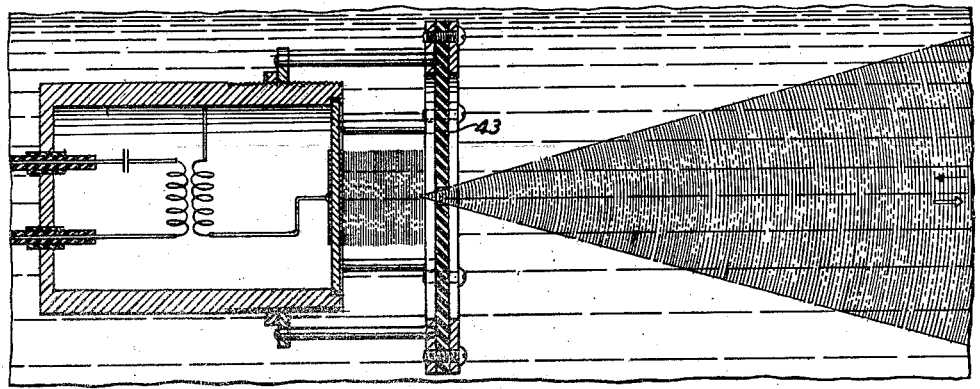
Fig. 4 is a view similar to that of Fig. 3, showing another form of ultrasonic acoustic lens similar to the pin hole "lens" sometimes used in photographic work.

The radar system itself uses a transmitting antenna having a directional pattern such that the first minimum occurs at about 10 degrees from the normal. In order to get this directivity, the antenna itself is about 6 wavelengths across. To get the same degree of directivity with a crystal vibrating at 10 megacycles would require a crystal radiating surface about .09 centimeter in diameter, which is rather small and impractical to couple to. A more practical device may be made with a crystal with a radiating area of one centimeter in diameter and to then use either a circular lens made of plastic as indicated in Fig. 3 or a thin sheet of $\rho c$ rubber with a .09 centimeter hole cut in it as indicated in Fig. 4. A suitable plastic is known having a velocity of $2.02 \times 10^5$ centimeters per second as compared to a velocity of $1.5 \times 10^5$ centimeters per second for water so that by using a lens thicker in the middle than on the outside, a diverging source is obtained. Since the radiation from the crystal is very directive, it can be considered as a source at infinity, and the radiation from the lens can be considered as coming from the virtual focus + of the lens, which can be placed at any desired value by shaping the lens. By adjusting the position of the virtual focus, the beam width can be spread at any angular value $\theta$ desired to simulate the radar antenna system.

This system has the further advantage that a much larger area is available from which to radiate energy and the loss introduced by the liquid can be made up by the larger amount radiated from the source, and the large amount of reflection picked up by the lens and concentrated on the crystal. For a crystal one centimeter in cross-section vibrating at 10 megacycles, the diameter is 66.6 wavelengths in water, compared to 6.6 that it would have to be to get the same directional pattern without the lens. For the same limiting energy per square centimeter, this represents a gain of 20 decibels on transmitting and a gain of 20 decibels on receiving. On the other hand, the lens system limits the nearness of approach of a reflecting system to the radiating system. For the $\rho c$ rubber with a hole cut in it, the rubber acts as a very good absorber, as will be discussed more in detail hereinafter, and allows only a radiation from the right size area to occur. This system allows a close approach but does not have the gain of a lens system.

A simple crystal system for a radiator is shown in Fig. 3. The crystal 35 may be two centimeters in diameter and have the middle centimeter plated on both sides. A small tab leads from the outside plating to the edge of the crystal which is plated all around so that it can be soldered into a thin metal shield 36. This soldered joint keeps the water from coming into the inside chamber. The crystal is .28 millimeter thick for a half wave length crystal at 10 megacycles, and is backed up by air on the inside and water on the outside. A crystal system similar to this is analyzed in the book "Electromechanical Transducers and Wave Filters," by W. P. Mason, chapter VII, and it is there shown that a 10 per cent band or a one megacycle band at 10 megacycles can be efficiently radiated provided that the crystal reactance is annulled by a coil or transformer 37. To get the maximum efficiency requires a pulse of at least 10 cycles long or about one microsecond pulses which is in the order of those used on radar systems. The efficiency of conversion for this system is rather high.

The transformer 37 comprises one winding connected between the metallic housing 36 and the inside plate of the crystal and another winding connected through a suitable condenser 38 to the conductors 39 and 40 leading to the radar circuit, such as conductors 27 of Fig. 2. A plastic lens 41 is mounted on a cage which is threaded on the housing 36 and may be locked in an adjusted position by the lock nut 42. The compressional wave from the outside face of the crystal and the widened beam after it has passed through the lens is indicated by the broken vertical lines. A similar arrangement is shown in Fig. 4 but here the lens 41 is replaced by a thin sheet of $\rho c$ rubber 43 with a hole of the proper dimensions cut through it along the axis of the device.

Ordinarily cavitation in the water limits the power output from a crystal unit to about one-third of a watt per square centimeter. There are indications, however, that cavitation is a process that requires time to develop and that for a very short pulse the energy density that can be put in the water may be considerably higher than this figure. The upper frequency limit of a unit of this type is set by the attenuation existing in the water. The best available figure for attenuation of a plane sound wave in water is $A = 0.25 \times 10^{-15} f^2$ nepers per centimeter.

At a frequency of 10 megacycles, this gives an attenuation of $A = .025$ nepers per centimeter $= .217$ decibel per centimeter.

For a path length of 30 inches, which corresponds to a radar distance of 50 miles, the attenuation amounts to 16.5 decibels which represents the added loss above that given by the spreading out effect. This can more than be made up by the additional power put in by the large crystal and lens system. However, at 20 megacycles the attenuation loss is four times this figure, or 66 decibels. Hence a frequency between 10 and 20 megacycles will be so high as can practically be obtained.

Such an electromechanical transducer unit is placed in a tank which gives negligible reflections from the walls at 10 megacycles. This is easily accomplished by lining the walls of the tank with a half inch sheet of $\rho c$ rubber, since measurements have shown that this has an impedance very close to that of water and an attenuation amounting to six decibels per centimeter at 1.5 megacycles. Since the attenuation increases proportionately to the square of the frequency, this would amount to 267 decibels per centimeter at 10 megacycles or 30.7 nepers per centimeter. Hence, a relatively thin section would give sufficient attenuation to annul any back surface reflections. The front surface reflections can be calculated from the impedance looking into the rubber, which for a viscous medium such as rubber is given by $$Z_0 = \rho v \left(1 + \frac{jvA}{2\pi f}\right) = \rho v (1 + 1.0732) \text{ at 10 megacycles}$$

where $\rho$ is the density of the material, $v$ the velocity of propagation, A the attenuation in nepers per centimeter and $f$ the frequency in cycles per second. Since the product of density and velocity matches that of water, the front face reflection factor should be $$\left[\frac{(\rho v)W - (\rho v)R(1 + j0.732)}{(\rho v)W + (\rho v)R(1 + j0.732)}\right] = .0366 = 28.7 \text{ db. down}$$

Hence, a thin layer of $\rho c$ rubber is a sufficient damping medium and might be incorporated in the tank as the lining 11 shown in Fig. 2.

While the invention contemplates the use of any liquid as a transmission medium, practical considerations dictate the use of water. If it is desirable to keep its velocity relatively constant around 25° C. about 35 per cent by weight of ethylene glycol may be added. This has the property of fixing a peak velocity at about 25° C. with very slight decreasing values above and below this temperature value. This amount of ethylene glycol will also prevent the water from freezing down to a low temperature.

Figure 5:
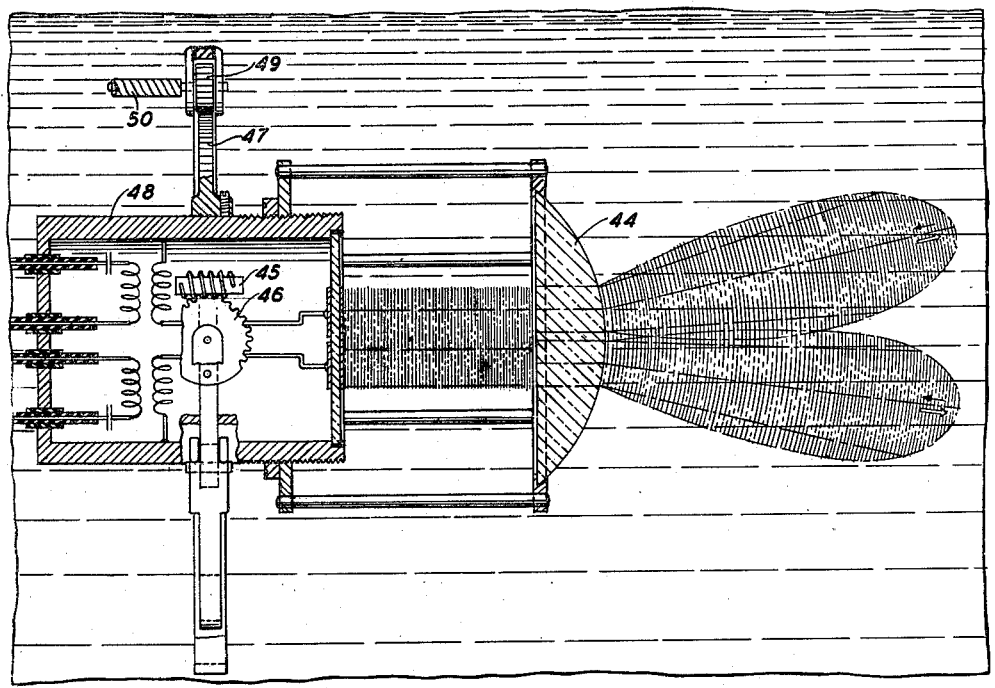
Fig. 5 is a similar view showing a transducer capable of transmitting and receiving two beams and arranged with an acoustic lens so that the beams diverge whereby a lobe comparison method of measurement may be used.

A split lobe modification of the radar can easily be simulated by using a crystal with two sets of platings as shown in Fig. 5. By dividing the inside plating in half and sending the waves through the lens 44, each half will have a slightly different directional pattern, as indicated by the lobes shaded by the broken lines. By comparing the output received from the two different halves of the crystal, and tuning the unit until the received response is the same on each half the direction of the reflection can be accurately located as in the radar system itself.

In Fig. 5 the worm and gear 45 and 46 represent the means similar to that operated by the flexible shaft 15 of Fig. 2 for making elevational adjustments. In this case a gear 47 may be attached to the casing 48 so that by a pinion 49 operated by a flexible shaft 50 the unit may be rotated on its axis for the purposes described.

A rotating beam type of radar can be simulated in several ways. For the pin hole type of radiator shown in Fig. 4, a prism 51 mounted in a frame 52 may be arranged to rotate about the longitudinal axis of the device. This will rotate the direction of the beam and by sending out two pulses when the diverging beam is in the two positions in the same horizontal plane and adjusting the angle until the size of the two reflections is equal, the azimuth angle can be accurately measured. By sending out pulses as the beam passes through a common vertical plane the colatitude angle is also determined. The shaft 53 and the cam 54 represent means to transmit pulses at proper intervals in the rotation of the beam.

Figure 8:
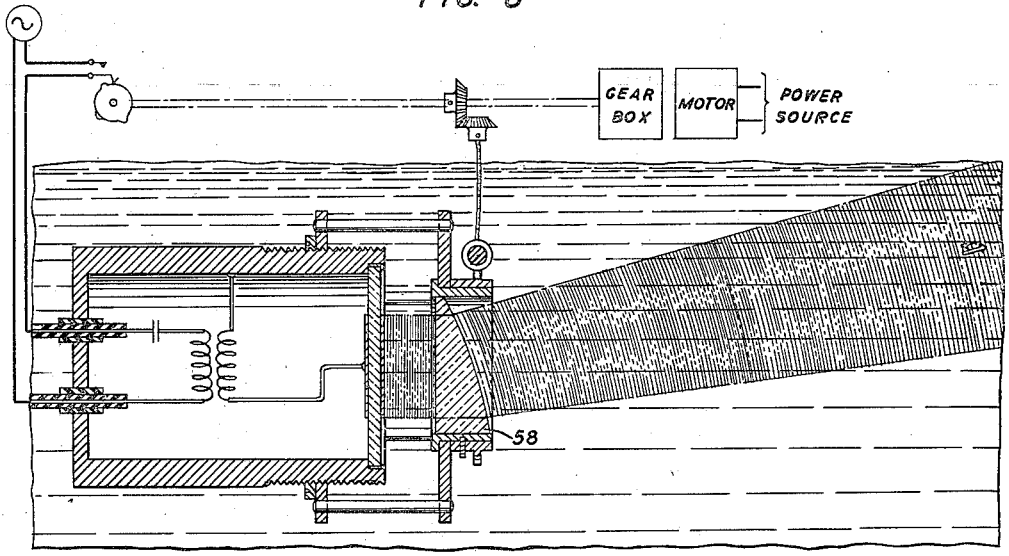
Fig. 8 is a similar view of a device equivalent to the arrangements of Figs. 6 and 7.
Figure 9:
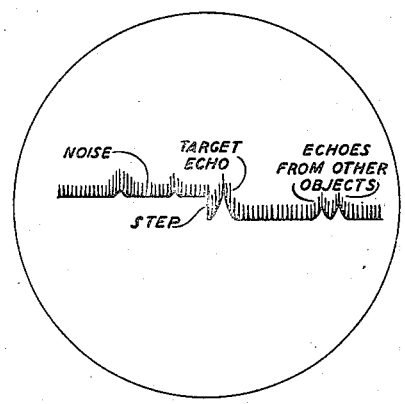
Fig. 9 is a representation of the screen of an oscilloscope showing the type of indication received in radar operation and used in the instruction of trainees.

For the lens type system, shown in Fig. 7, a prism 55 between the crystal 56 and the lens 57 will perform the same function. The prism can be built into the lens by putting the center of curvature off the center line as indicated by the edge section of a lens 58 in Fig. 8.

Small models of airplanes and different types of reflecting backgrounds can be simulated by small scale models. The filament 9 shown in Fig. 1 may be plastic having properties matching water so that it will not offer any competing reflections. In this way the complete action of a radar system can be simulated and a simple and compact trainer obtained which can be put in a small space.

What is claimed is:

1. A training device comprising a radio detection and ranging system in which an electromechanical transducer for transmitting and receiving compressional waves in a comparatively dense liquid medium is substituted for the radio antenna.

2. A training device comprising a tank for holding a comparatively dense liquid medium, miniature objects for immersion in said medium at different locations therein, an electromechanical transducer for transmitting and receiving compressional waves in said medium immersed therein and a radio detection and ranging system connected to said transducer, whereby a trainee may be taught the method of manipulating the controls of a radio detecting and ranging device.

3. In a device for training operators of a radio detection and ranging system, a complete and conventional radio detection and ranging system having an electromechanical transducer for transmitting and receiving compressional waves in a comparatively dense medium substituted for the conventional radio antenna, a tank filled with a comparatively dense liquid medium, said transducer being immersed in the said medium and miniature objects for immersion in different positions in said medium.

4. In a device for training operators of a radio detection and ranging system a liquid compressional wave transmission medium, movable reflecting surfaces in said medium and an electromechanical transducer responsive to energy conventionally transmitted to the antenna of such a system for translating to and from compressional waves in said liquid medium when said transducer is immersed therein for simulating the action of the radio antenna in a conventional radio detection and ranging system, said transducer comprising a narrow beam projector and an acoustic lens placed in the path of the beam for broadening the said beam to simulate the pattern of the beam from the said conventional antenna.

5. In a device for training operators of a radio detection and ranging system, a substitute for the conventional antenna thereof comprising an electromechanical transducer immersed in a liquid compressional wave transmitting medium, said transducer having an inherently narrow beam lobe pattern of transmission, said transducer being provided with additional means for broadening the lobe pattern thereof to simulate the lobe pattern of said replaced antenna, said broadening means comprising a sheet of energy absorbing material pierced by an opening of small dimensions placed directly in the beam of said transducer, said sheet being normal to said beam.

6. In a device for training operators of a radio detection and ranging system, a substitute for the conventional antenna thereof comprising an electromechanical transducer immersed in a liquid compressional wave transmitting medium, said transducer being provided with an acoustic prism rotating about an axis coinciding with the axis of the transmission beam of said transducer.

7. In a device for training operators of a radio detection and ranging system, a substitute for the conventional antenna thereof comprising an electromechanical transducer immersed in a liquid compressional wave transmitting medium, said transducer provided with an acoustic lens for broadening the transmission beam of said transducer, said lens being placed normal to the said beam and having its center of curvature off-center, and means for rotating said lens about an axis coinciding with the axis of the transmission beam of said transducer whereby a rotating beam of a lobe pattern comparable to the lobe pattern of a conventional radio antenna is produced.

8. In a device for training operators of a split lobe radio detection and ranging system, a substitute for the antenna thereof comprising an electromechanical transducer immersed in a liquid compressional wave transmission medium, said transducer being constructed of a piezoelectric crystal having two sets of electrodes plated thereon for transmitting two beams from slightly different areas thereof and an acoustic lens having an axis parallel to the axes of said two beams and located therebetween whereby said beams are caused to become divergent.

WARREN P. MASON.